(12) United States Patent
Suarez et al.

(10) Patent No.: US 10,380,061 B2
(45) Date of Patent: Aug. 13, 2019

(54) DUAL I2C AND SPI SLAVE FOR FPGA AND ASIC IMPLEMENTATION

(71) Applicant: The United States of America as represented by the Administrator of NASA, Washington, DC (US)

(72) Inventors: George Suarez, Columbia, MD (US); Jeffrey J. Dumonthier, Ashburn, VA (US); George E. Winkert, Highland, MD (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 15/854,505

(22) Filed: Dec. 26, 2017

(65) Prior Publication Data

US 2019/0197007 A1   Jun. 27, 2019

(51) Int. Cl.
| | | |
|---|---|---|
| G06F 13/42 | (2006.01) |
| G06F 13/38 | (2006.01) |
| G06F 9/30 | (2018.01) |
| G06F 13/36 | (2006.01) |
| G06F 13/40 | (2006.01) |

(52) U.S. Cl.
CPC ...... *G06F 13/4282* (2013.01); *G06F 9/30098* (2013.01); *G06F 13/36* (2013.01); *G06F 13/385* (2013.01); *G06F 13/4004* (2013.01)

(58) Field of Classification Search
None
See application file for complete search history.

(56) References Cited

U.S. PATENT DOCUMENTS

2006/0195286 A1* 8/2006 Tsai ..................... G01R 31/041
                                                              702/117
2018/0173465 A1* 6/2018 Tanaka ................. G06F 3/0659

* cited by examiner

*Primary Examiner* — Ilwoo Park
(74) *Attorney, Agent, or Firm* — Christopher O. Edwards; Bryan A. Geurts; Mark P. Dvorscak (57) ABSTRACT

A digital serial communication system includes a first serial communication circuit configured to exchange information utilizing a first communication protocol, a second serial communication circuit configured to exchange information utilizing a second communication protocol, and a common bus interface configured to couple the first serial communication circuit to a first serial communication bus implementing the first communication protocol, and configured to couple the second serial communication circuit to a second serial communication bus implementing the second communication protocol.

12 Claims, 5 Drawing Sheets

DUAL I2C AND SPI SLAVE FOR FPGA AND ASIC IMPLEMENTATION

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

BACKGROUND

The disclosed embodiments generally relate to serial digital communication systems, and in particular, to a combination Inter-Integrated circuit (I2C) and serial to parallel (SPI) system.

Both the I2C and SPI communication protocols provide on-chip capabilities which allow compatible devices to communicate directly with each other. The I2C and SPI systems both provide serial communication between a master unit and slave unit, but use different signals and different protocols. An I2C bus typically utilizes two signal lines, serial data (SDA) and serial clock (SCL), for serial bi-directional data transfers. An SPI bus typically utilizes four signal lines, slave select (SS), serial clock (SCK), Master Out/Slave In data input (MOSI), and Master In/Slave Out data output (MISO), for serial bi-bidirectional transfers. The busses have different configurations and operate with different protocols. As a result, an electronic device configured with an I2C interface is required for use in a system with an I2C bus, and the equivalent electronic device must be configured with an SPI interface in order to operate in a system with an SPI bus. For example, an LCD driver coupled to an I2C interface is not usable in an SPI based system and the LCD driver coupled to an SPI interface is not usable in an I2C based system. It would be advantageous to provide an interface that allows an electronic device to be selectively coupled to both an I2C and an SPI communication system.

SUMMARY

The disclosed embodiments are directed to a digital serial communication system including a first serial communication circuit configured to exchange information utilizing a first communication protocol, a second serial communication circuit configured to exchange information utilizing a second communication protocol, and a common bus interface configured to couple the first serial communication circuit to a first serial communication bus implementing the first communication protocol, and configured to couple the second serial communication circuit to a second serial communication bus implementing the second communication protocol.

The first serial communication circuit may include an inter-integrated circuit (I2C) communication circuit and the second serial communication circuit may include a serial to parallel interface (SPI) communication circuit.

The digital serial communication system may include a first signal path between the common bus interface and the first serial communication circuit having first communication protocol signal lines, and a second signal path between the common bus interface and the second serial communication circuit having second communication protocol signal lines.

The first signal path may include I2C protocol signal lines and the second signal path may include SPI protocol signal lines.

The common bus interface may include a signal line having a first state for enabling the first selectable serial communication circuit and disabling the second selectable serial communication circuit, and a second state for disabling the first selectable serial communication circuit and enabling the second selectable serial communication circuit.

The digital serial communication system may also include a register bank connected to the first and second serial communication circuits and configured to store data from the first and second serial communication circuits.

The digital serial communication system may further include a multiplexer coupled between the first and second serial communication circuits and the register bank, a third signal path between the first serial communication circuit and the multiplexer, and a fourth signal path between the second serial communication circuit and the multiplexer. The multiplexer may include an input connected to the common bus interface signal line and wherein the multiplexer is configured to connect the third signal path to the register bank when the common bus interface signal is in the first state, and to connect the fourth signal path to the register bank when the common bus interface signal is in the second state.

The register bank may include a read/write register, a read only register, and decoder circuitry that, upon receiving a specially designated address to which data is to be written, transfers data from the read/write register to the read only register.

The register bank may also include an output that couples the data in the read only register to an electronic device.

The disclosed embodiments are also directed to a digital serial communication method including providing first and second serial communication circuits configured to exchange information utilizing a first communication protocol and a second communication protocol, respectively, and using a common bus interface to selectively: couple the first serial communication circuit to a first serial communication bus implementing the first communication protocol; and couple the second serial communication circuit to a second serial communication bus implementing the second communication protocol.

The first serial communication circuit may include an inter-integrated circuit (I2C) communication circuit and the second serial communication circuit may include a serial to parallel interface (SPI) communication circuit.

The digital serial communication method may include providing a first signal path between the common bus interface and the first serial communication comprising first communication protocol signal lines, and providing a second signal path between the common bus interface and the second serial communication comprising second communication protocol signal lines.

The first signal path may include I2C protocol signal lines and the second signal path may include SPI protocol signal lines.

The digital serial communication method may also include enabling the first selectable serial communication circuit and disabling the second selectable serial communication circuit upon the common bus interface receiving a signal having a first state, and disabling the first selectable serial communication circuit and enabling the second selectable serial communication circuit upon the common bus interface receiving the signal having a second state.

The digital serial communication method may further include storing data from the first and second serial communication circuits in a read/write register of a register bank.

The digital serial communication method may include multiplexing signals from the first serial communication circuit to the register bank when the signal received by the common bus interface is in the first state, and multiplexing signals from the second serial communication circuit to the register bank when the signal received by the common bus interface is in the second state.

The digital serial communication method may still further include transferring data from the read/write register to a read only register of the register bank upon receiving a specially designated address to which data is to be written.

The digital serial communication method may yet further include coupling the data in the read only register to an electronic device.

BRIEF DESCRIPTION OF THE DRAWINGS

The foregoing aspects and other features of the embodiments are explained in the following description, taken in connection with the accompanying drawings, wherein.

DETAILED DESCRIPTION

Although the disclosed embodiments will be described with reference to the embodiments shown in the drawings and described below, it should be understood that these could be embodied in many alternate forms. In addition, any suitable size, shape or type of elements or materials could be used.

Figure 1:
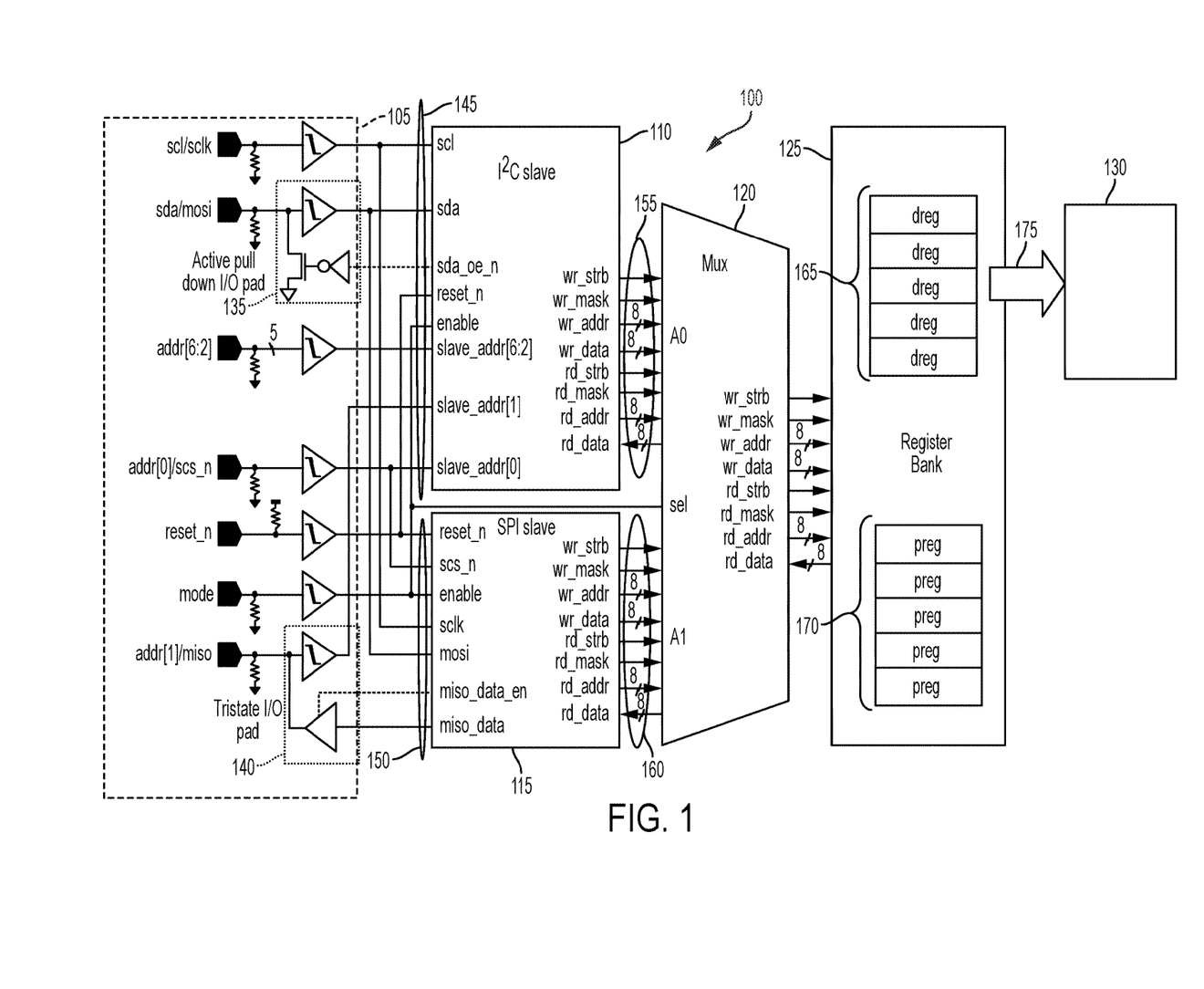
FIG. 1 illustrates an example of a dual I2C and SPI device interface according to the disclosed embodiments.

FIG. 1 illustrates an example of a digital serial communication system 100 having a dual I2C and SPI device interface according to the disclosed embodiments. In one or more embodiments, the digital serial communication system 100 may be implemented as part of an integrated circuit, for example, a Field Programmable Gate Array (FPGA), or an Application Specific Integrated Circuit (ASIC). A hardware description language may be used to describe the structure and operation of the interface, determine an architecture and logic gate layout, and then may be used to establish interconnections in the FPGA, or used to fabricate the ASIC. The digital serial communication system 100 may include a common bus interface circuit 105, communication circuitry configured as an I2C slave 110, communication circuitry configured as an SPI slave 115, a multiplexer 120, and a register bank 125 for providing data and control signals to one or more electronic devices 130. In some embodiments, the common bus interface circuit 105, the I2C slave communication circuitry 110, the SPI slave communication circuitry 115, the multiplexer 120, the register bank 125, and the one or more electronic devices 130 may be implemented as individual integrated circuits, a combination of integrated circuits that may include different components of the digital serial communication system 100, or as a single integrated circuit.

The common bus interface circuit 105 generally provides signals between an I2C bus or an SPI bus and the I2C slave communication circuitry 110 and the SPI slave communication circuitry 115. The common bus interface circuit 105 may include one or more connectors, signal lines, pull up or pull down resistors, drivers, tri-state buffers, or other circuitry suitable for providing electrical pathways between the I2C and SPI busses and the I2C slave communication circuitry 110 and the SPI slave communication circuitry 115.

The disclosed I2C slave communication circuitry 110 may be connected to a first signal path 145 that provides I2C protocol signals between the I2C slave communication circuitry 110 and the common bus interface circuit 105. The first signal path 145 may utilize an enable signal line ENABLE_I2C which may selectively enable the I2C slave communication circuitry 110, a serial data signal line SDA for bi-directional data communication between the I2C slave communication circuitry 110 and the at least one I2C master, a serial clock signal line SCL that provides a common clock from the at least one I2C master, a reset signal line RESET_I2C to reset registers and outputs, and 7 address lines SLAVE_ADDR [6:0]. In some embodiments, the I2C slave communication circuitry 110 may be implemented without a sampling clock and may include circuitry for determining I2C control events such as START, STOP, and RESTART by using the serial data signal line SDA and the serial clock signal line SCL.

The disclosed SPI slave communication circuitry 115 may have a first signal path 150 that operates according to an SPI protocol. The first signal path 150 may utilize an enable signal line ENABLE_SPI which may selectively enable the SPI slave communication circuitry 115, a slave select signal line SCS_n that provides a slave select signal from the at least one SPI master, a serial clock signal line SCK that provides a common clock from the at least one SPI master, a Master Out/Slave In data input signal line MOSI for receiving data from the at least one SPI master, a Master In/Slave Out data output signal line MISO for providing data from the SPI slave communication circuitry 115 to the at least one SPI master, and a reset signal line RESET_SPI to reset registers and outputs.

The common bus interface circuit 105 may couple to an I2C bus or an SPI bus, and may provide the following signal lines between the common bus interface circuit 105 and the first signal paths 145, 150 of the I2C and SPI slave communication circuitry 110, 115:

Signal line RESET_N provides the RESET_I2C signal to the I2C slave communication circuitry 110 and the RESET_SPI signal to the SPI slave communication circuitry 115. The RESET_N signal may be a two state, active low signal and may cause the I2C slave communication circuitry 110 and the SPI slave communication circuitry 115 to reset all registers and outputs.

Signal line MODE provides the ENABLE_I2C signal to the I2C slave communication circuitry 110 and the ENABLE_SPI signal to the SPI slave communication circuitry 115. The MODE signal may be a two state signal, and may selectively enable the I2C slave communication circuitry 110 and disable the SPI slave communication circuitry 115 in a first state, and enable the SPI slave communication circuitry 115 and disable the I2C slave communication circuitry 110 in a second state.

Signal line SCL/SCK provides the serial clock SCL signal to the I2C slave communication circuitry 110 and the serial clock SCK signal to the SPI slave communication circuitry 115.

Signal line SDA/MOSI provides the serial data SDA signal to the I2C slave communication circuitry 110 and the Master Out/Slave In data input MOSI signal to the SPI slave communication circuitry 115. The common bus interface circuit 105 may include an active pull down tri-state buffer 135 connected to the SDA/MOSI signal line and controlled by the I2C slave communication circuitry 110 for sending data to at least one I2C master over the SDA signal line.

Signal line ADDR[0]/SCS_n provides the SLAVE_ADDR [0] signal to the I2C slave communication circuitry 110 and the slave select SCS_n signal to the SPI slave communication circuitry 115.

Signal line ADDR[1]/MISO provides the SLAVE_ADDR [1] signal to the I2C slave communication circuitry 110 and provides the output signal line MISO from the SPI slave communication circuitry 115 to the interface 105. The common bus interface circuit 105 may include an active pull down tri-state buffer 140 connected to the ADDR[1]/MISO signal line and controlled by the SPI slave communication circuitry 115 for sending data to at least one SPI master over the MISO signal line.

Signal lines ADDR[6:2] provide the SLAVE_ADDR[6:2] signals to the I2C slave communication circuitry 110. It should be noted that the ADDR[6:2] signal lines are tied to a high voltage or to a low voltage to assign an I2C address to the digital serial communication system 100.

Each of the I2C and SPI slave circuits 105, 110 may include a second signal path 155, 160 for exchanging information with the register bank 125 through the multiplexer 120. The second signal path 155, 160 for each slave circuit may include the following signals:

A write strobe signal line WR_STRB, generated by each of the slave circuits 105, 110 and used to write to the registers in the register bank 125, A write mask signal line WR_MASK, generated by each of the slave circuits 105, 110 and used as an enable signal to allow writing to the registers in the register bank 125. When asserted low, the WR_MASK signal disables the WR_STRB signal, Eight write address signal lines WR_ADDR[7:0], generated by each of the slave circuits 105, 110, designating the address in the register bank to be written, Eight write data signal lines WR_DATA[7:0] generated by each of the slave circuits 105, 110 containing the data to be written to the WR_ADDR[7:0] address, A read strobe signal line RD_STRB, generated by each of the slave circuits 105, 110 and used to read from the registers in the register bank 125, A read mask signal line RD_MASK, generated by each of the slave circuits 105, 110 and used as an enable signal to allow reading from the registers in the register bank 125. When asserted low, the RD_MASK signal disables the RD_STRB signal, Eight read address signal lines RD_ADDR[7:0] generated by each of the slave circuits 105, 110, designating the address in the register bank to be read, Eight read data signal lines RD_DATA[7:0] generated by the register bank 125 containing data read from the RD_ADDR[7:0] address.

Signal line MODE from the common bus interface circuit 105 provides a select signal to the multiplexer for selectively coupling the second signal path 155 of the I2C slave circuit 110 to the register bank 125, or coupling the second signal path 160 of the SPI slave circuit 115 to the register bank 125.

The register bank 125 may be configured as any set of registers suitable for storing information from the multiplexer 120 and from electronic device 130, and for providing information to the multiplexer and to the electronic device 130. In some embodiments, the register bank 125 may be configured as a read only data register 165 designated dreg[xx:xx] and a read/write register 170 designated preg [xx:xx], where [xx:xx] indicates the number of the last bit and the number of the first bit of the register, respectively. In one or more embodiments, the read only register dreg 165 and the read/write register preg 170 may be configured as an 80 bit register, e.g., dreg[79:00] and preg[79:00], however, it should be understood that the dreg 165 and preg 170 registers may be configured with any suitable number of bits. The register bank 125 may also be configured to allow read and write operations to the preg register 170 and, may include decoder circuitry that, upon receiving a specially designated address to which data is to be written, may transfer data from the preg register 170 to the dreg register 165. The register bank 125 may have a signal path 175 for providing data to the electronic device 130. In at least one embodiment, the signal path 175 provides the contents of the read only data register dreg 165 in parallel to the electronic device 130

The I2C slave communication circuitry 110 becomes operational when the MODE signal from the common bus interface circuit 105 providing the ENABLE_I2C signal to the I2C slave communication circuitry 110 is asserted in the first state. The I2C slave communication circuitry 110 may read from and write to the read/write register preg 170, and read from the read only data register dreg 165 in the register bank 125, using a single byte, 8 bit format. When the I2C slave communication circuitry 110 performs a write transaction to address 8'FF (255) in the data register 125, a load signal is generated in the register bank 125 that loads the contents of the read/write register preg 170 into the read only data register dreg 165. Table 1 below illustrates exemplary I2C slave communication circuitry 110 read and write transactions when the read only register dreg 165 and the read/write register preg 170 are configured as 80 bit registers.

TABLE 1

| I2C SubAddr | R/W or R | Register |
|---|---|---|
| 11111111 | W | Loads data |
| 00010011 | R | dreg[79:72] |
| 00010010 | R | dreg[71:64] |
| 00010001 | R | dreg[63:56] |
| 00010000 | R | dreg[55:48] |
| 00001111 | R | dreg[47:40] |
| 00001110 | R | dreg[39:32] |
| 000001101 | R | dreg[31:24] |
| 00001100 | R | dreg[23:16] |
| 00001011 | R | dreg[15:8] |
| 00001010 | R | dreg[7:0] |
| 00001001 | R/W | preg[79:72] |
| 00001000 | R/W | preg[71:64] |
| 00000111 | R/W | preg[63:56] |
| 00000110 | R/W | preg[55:48] |
| 00000101 | R/W | preg[47:40] |
| 00000100 | R/W | preg[39:32] |
| 00000011 | R/W | preg[31:24] |
| 00000010 | R/W | preg[23:16] |
| 00000001 | R/W | preg[15:8] |
| 00000000 | R/W | preg[7:0] |

Figure 2:
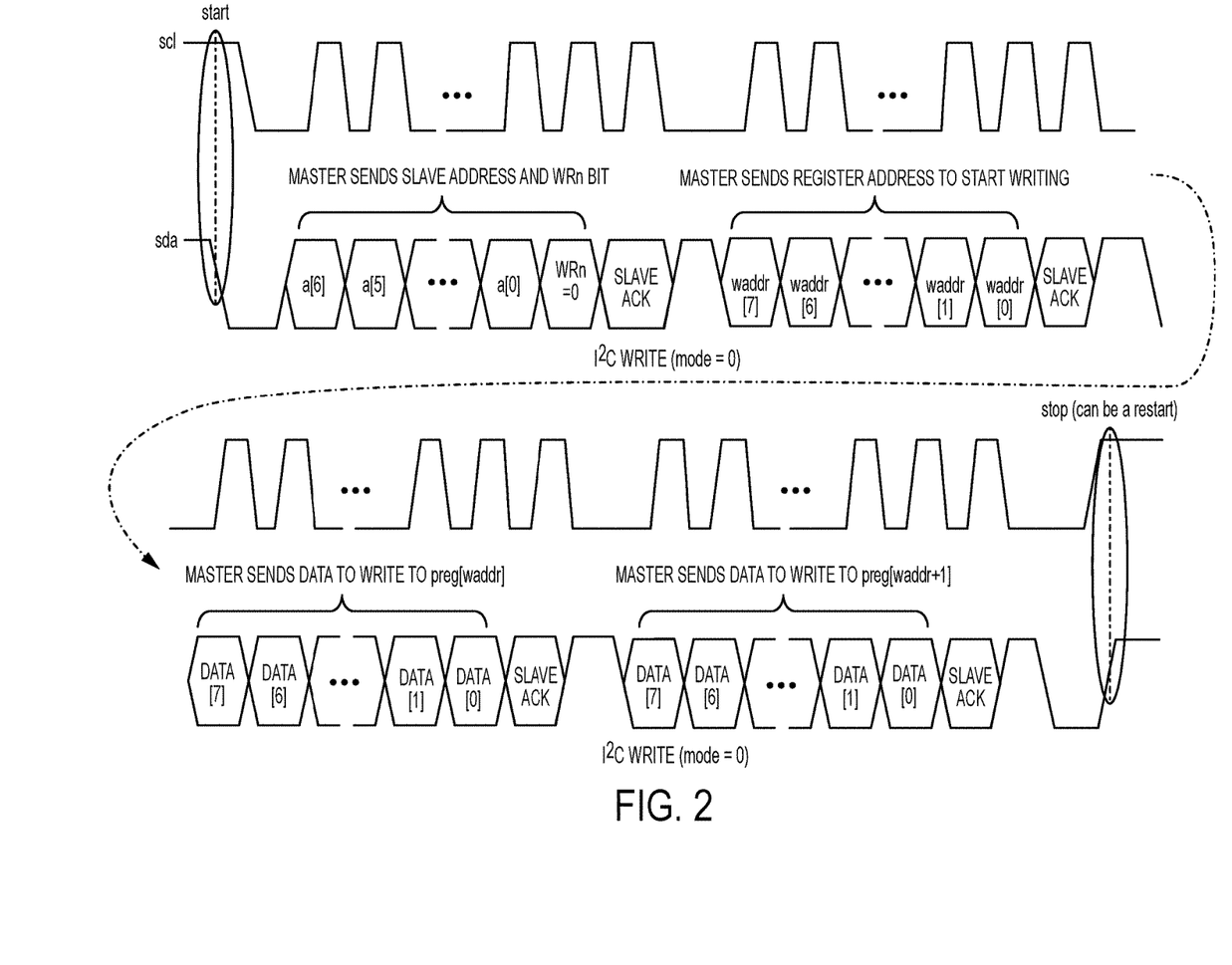
FIG. 2 shows an example of an I2C slave transaction that writes data to a register bank in response to commands and data sent from an I2C master.

FIG. 2 shows an example of an I2C slave transaction that writes data to the read/write register preg 170 in the register bank 125 in response to commands and data sent from an I2C master on the serial data SDA signal line. The I2C master sends a slave address and a write bit. Upon recognizing the slave address, the I2C slave 110 responds with an acknowledge bit. The I2C master then sends an initial register address (e.g., an I2C SubAddr from Table 1) at which to begin writing. Upon receiving the initial register address, the I2C slave 110 responds with an acknowledge bit. The I2C master then sends data to be written to the initial register address, and then sends data to be written to subsequent consecutive addresses. Upon receipt of each byte, the I2C slave 110 responds with an acknowledge bit and writes the data to the corresponding address in the read/write register preg 170 in the register bank 125. The transaction continues until the I2C master sends a stop or restart command.

Figure 3:
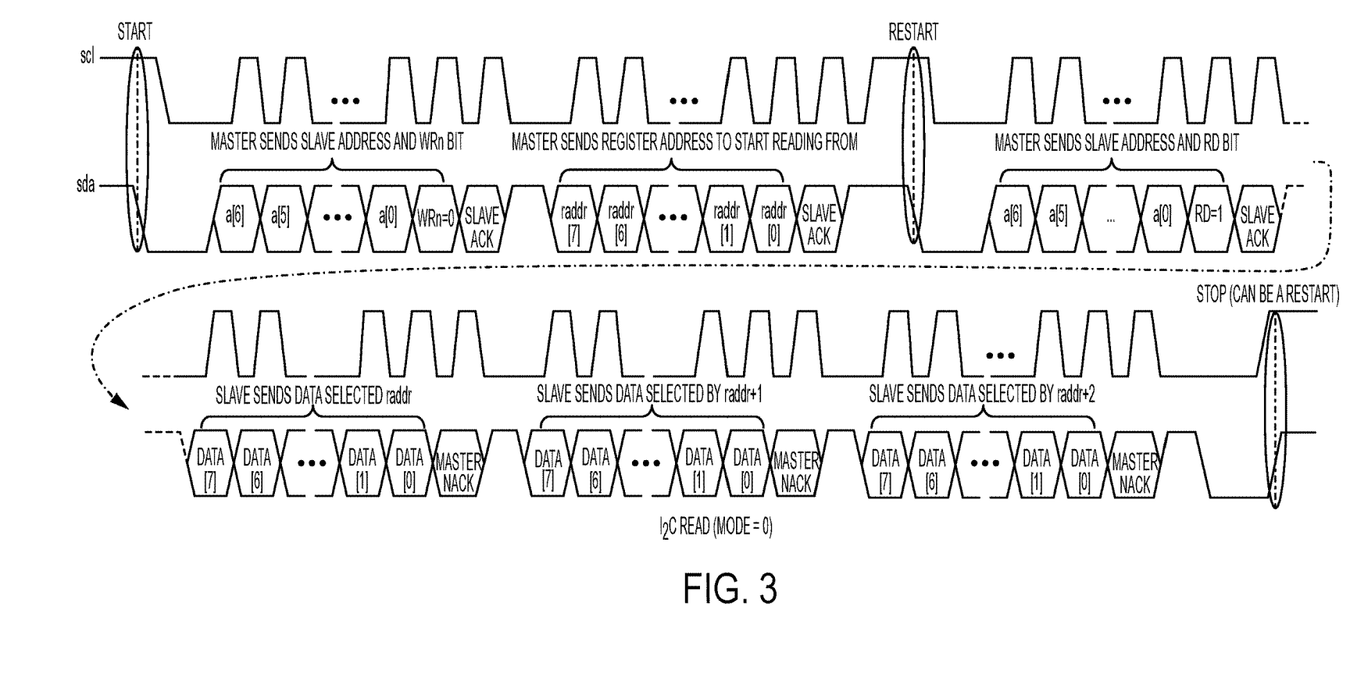
FIG. 3 shows an example of an I2C slave transaction that reads data from a register bank in response to commands from an I2C master.

FIG. 3 shows an example of an I2C slave transaction that reads data from the read only data register dreg 165 in the register bank 125, or from the read/write register preg 170 in the register bank 125, in response to commands from an I2C master on the serial data SDA signal line. The I2C master sends a slave address and a write bit. Upon recognizing the slave address, the I2C slave 110 responds with an acknowledge bit. The I2C master then sends an initial register address (e.g., an I2C SubAddr from Table 1) from which to begin reading. Upon receiving the initial register address, the I2C slave 110 again responds with an acknowledge bit. The I2C master then sends the slave address again with a read bit which is acknowledged by the I2C slave. The I2C slave then sends the data from the address in the read/write register preg 170 corresponding to the initially specified register address and then sends data from subsequent consecutive addresses. Upon receipt of each data byte, the I2C master responds with an acknowledge bit. The transaction continues until the I2C master sends a stop or restart command.

The SPI slave communication circuitry becomes operational when the MODE signal from the common bus interface circuit 105 providing the ENABLE_SPI signal to the SPI slave communication circuitry 115 is asserted in the second state. The SPI slave communication circuitry 115 may read from and write to the read/write register preg 170, and read from the read only data register dreg using a two byte, 16 bit format. When the SPI slave communication circuitry 115 performs a write transaction to address F (1111) in the data register 125, a load signal is generated in the register bank 125 that loads the contents of the read/write register preg 170 into the read only data register dreg 165. Table 2 below illustrates exemplary SPI slave communication circuitry read and write transactions when the read only register dreg 165 and the read/write register preg 170 are configured as 80 bit registers.

TABLE 2

| SPI RDn/WR | SPI SubAddr | Register |
|---|---|---|
| 1 | All Others | N/A |
| 1 | 0100 | preg[39:32] |
| 1 | 0011 | preg[31:24] |
| 1 | 0010 | preg[23:16] |
| 1 | 0001 | preg[15:8] |
| 1 | 0000 | preg[7:0] |
| 0 | 1001 | dreg[79:64] |
| 0 | 1000 | dreg[63:48] |
| 0 | 0111 | dreg[47:32] |

TABLE 2-continued

| SPI RDn/WR | SPI SubAddr | Register |
|---|---|---|
| 0 | 0110 | dreg[31:16] |
| 0 | 0101 | dreg[15:00] |
| 0 | 0100 | preg[79:64] |
| 0 | 0011 | preg[63:48] |
| 0 | 0010 | preg[47:32] |
| 0 | 0001 | preg[31:16] |
| 0 | 0000 | preg[15:00] |

Figure 4A:
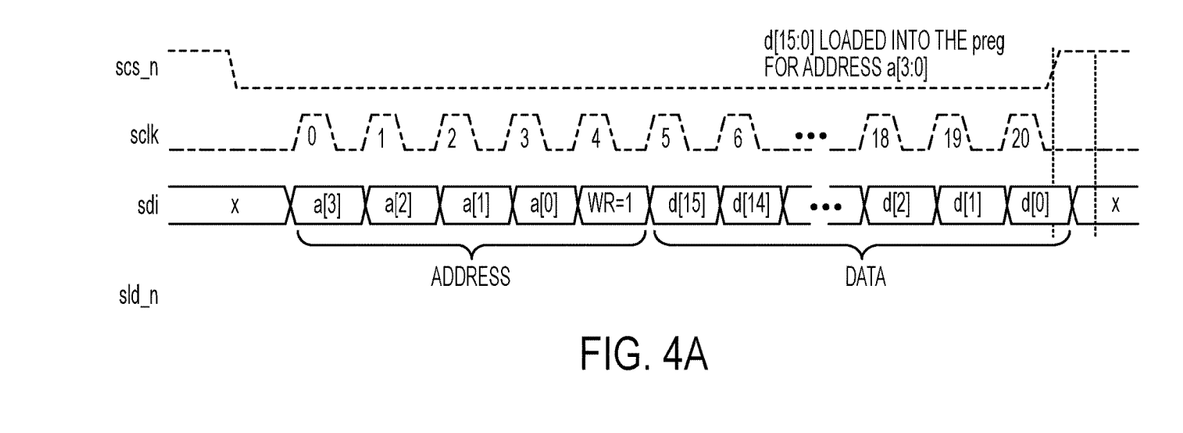
FIGS. 4A and 4B show examples of SPI slave transactions that write data to a register bank in response to commands and data sent from an SPI master.
Figure 4B:
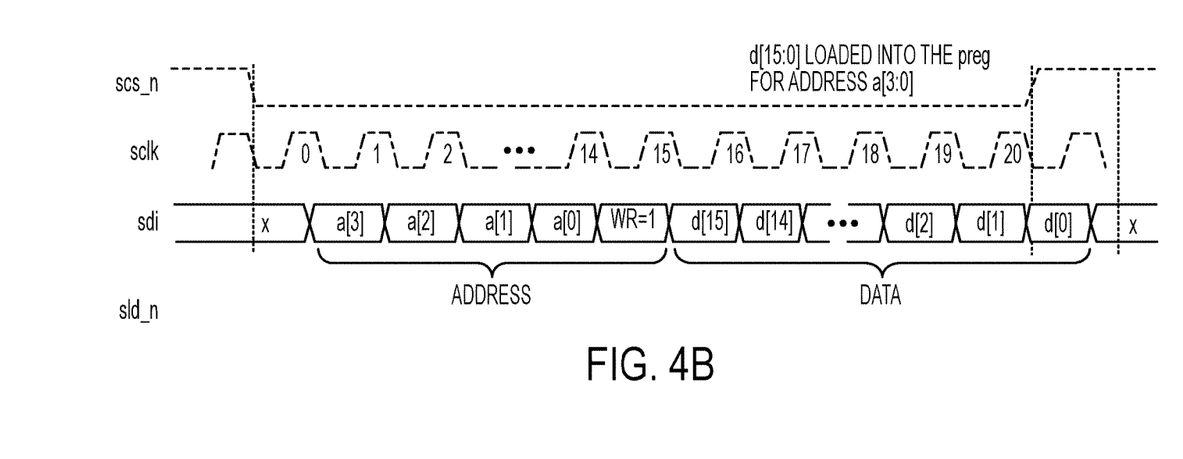

FIGS. 4A and 4B show examples of SPI slave transactions that write data d[15:0] to an exemplary location address (SPI SubAddr in Table 2) in the read/write register preg 170 in the register bank 125, in response to commands and data sent from an SPI master. FIG. 4A shows exemplary transactions where the SPI slave master provides the serial clock SCL signal only for the duration of the data transfer, while FIG. 4B shows exemplary transactions where the SPI slave master provides the serial clock SCL signal as a constantly running clock. The SPI master initiates the transaction by asserting the slave select SCS_n signal. The SPI master then sends an initial register address (e.g., an SPI SubAddr from Table 2) at which to begin writing data and a write bit on the MOSI signal line. The SPI master then sends data on the MOSI signal line to be written to the initial register address. The SPI master then sends the next register address at which to begin writing with a write bit on the MOSI signal line, and then sends data on the MOSI signal line to be written to the next register address. The SPI master continues to send address and data pairs until the desired number of read/write registers preg have been written.

Figure 5A:
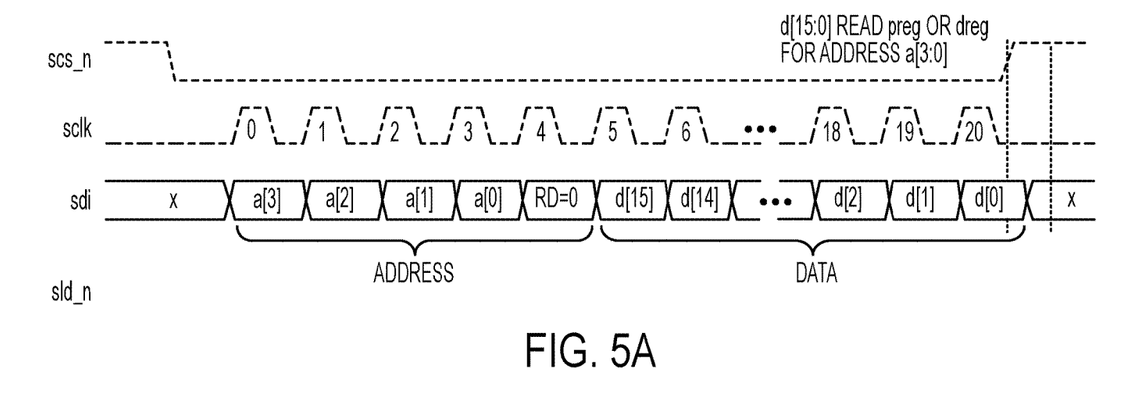
FIGS. 5A and 5B show examples of SPI slave transactions that read data from a register bank in response to commands from an SPI master.
Figure 5B:
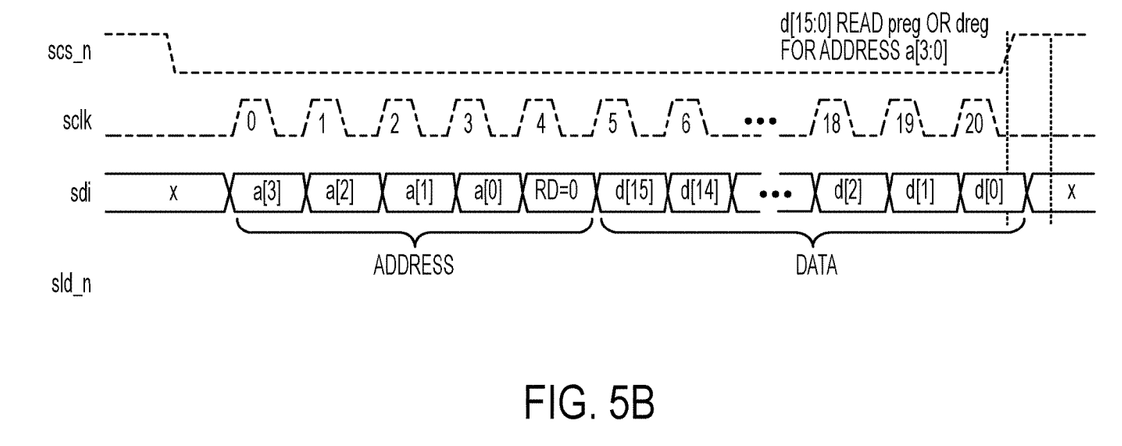

FIGS. 5A and 5B show examples of SPI slave transactions that read data from the read only data register dreg 165 in the register bank 125, or from the read/write register preg 170 in the register bank 125, in response to commands from an SPI master. FIG. 5A shows exemplary transactions where the SPI slave master provides the serial clock SCL signal only for the duration of the data transfer, while FIG. 5B shows exemplary transactions where the SPI slave master provides the serial clock SCL signal as a constantly running clock. The SPI master initiates the transaction by asserting the slave select SCS_n signal. The SPI master then sends an initial register address (e.g., an SPI SubAddr from Table 2) at which to begin reading data and a read bit on the MOSI signal line. The SPI slave communication circuitry 115 then sends the data from the initial register address to the SPI master on the MISO signal line. The SPI master then sends the next register address at which to read data with a read bit on the MOSI signal line, and the SPI slave responds with the data from the specified register. The SPI master continues to send addresses from which to read, and the SPI slave continues to provide data from the registers until the desired number of register bits have been read.

The disclosed embodiments thus provide a digital serial communication system that provides a common bus interface circuit, selectable serial communication circuitry that operates as an I2C slave or an SPI slave, and a register bank for exchanging data and control signals with the I2C slave or the SPI slave and one or more electronic devices.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A digital serial communication system comprising:
   a first serial communication circuit configured to exchange information utilizing a first communication protocol;
   a second serial communication circuit configured to exchange information utilizing a second communication protocol;
   a common bus interface configured to couple the first serial communication circuit to a first serial communication bus implementing the first communication protocol, and configured to couple the second serial communication circuit to a second serial communication bus implementing the second communication protocol;
   wherein the common bus interface comprises a signal line having a first state for enabling the first selectable serial communication circuit and disabling the second selectable serial communication circuit, and a second state for disabling the first selectable serial communication circuit and enabling the second selectable serial communication circuit; further comprising a register bank connected to the first and second serial communication circuits and configured to store data from the first and second serial communication circuits;
   a multiplexer coupled between the first and second serial communication circuits and the register bank;
   a third signal path between the first serial communication circuit and the multiplexer; and
   a fourth signal path between the second serial communication circuit and the multiplexer
   wherein the multiplexer includes an input connected to the common bus interface signal line and wherein the multiplexer is configured to connect the third signal path to the register bank when the common bus interface signal is in the first state, and to connect the fourth signal path to the register bank when the common bus interface signal is in the second state;
   wherein the register bank comprises
      a read/write register;
      a read only register; and
   decoder circuitry that, upon receiving a specially designated address to which data is to be written, transfers data from the read/write register to the read only register.

2. The digital serial communication system of claim 1, wherein the first serial communication circuit comprises an inter-integrated circuit (I2C) slave circuit and the second serial communication circuit comprises a serial to parallel interface (SPI) slave circuit.

3. The digital serial communication system of claim 1, comprising:
   a first signal path between the common bus interface and the first serial communication circuit comprising first communication protocol signal lines; and
   a second signal path between the common bus interface and the second serial communication circuit comprising second communication protocol signal lines.

4. The digital serial communication system of claim 3, wherein the first signal path comprises I2C protocol signal lines and the second signal path comprises SPI protocol signal lines.

5. The digital serial communication system of claim 1, wherein the register bank comprises an output that couples the data in the read only register to an electronic device.

6. A digital serial communication method, comprising:
   using a common bus interface to selectively:
      couple a first serial communication circuit to a first serial communication bus implementing a first communication protocol; and
      couple a second serial communication circuit to a second serial communication bus implementing a second communication protocol;
   exchanging information through one of the first and second serial communication circuit utilizing one of the first communication protocol and the second communication protocol, respectively;
   storing data from the first and second serial communication circuits in a read/write register of a register bank; and
   transferring data from the read/write register to a read only register of the register bank upon receiving a specially designated address to which data is to be written.

7. The digital serial communication method of claim 6, wherein the first serial communication circuit comprises an inter-integrated circuit (I2C) communication circuit and the second serial communication circuit comprises a serial to parallel interface (SPI) communication circuit.

8. The digital serial communication method of claim 6, comprising:
   providing a first signal path between the common bus interface and the first serial communication circuit comprising first communication protocol signal lines; and
   providing a second signal path between the common bus interface and the second serial communication circuit comprising second communication protocol signal lines.

9. The digital serial communication method of claim 8, wherein the first signal path comprises I2C protocol signal lines and the second signal path comprises SPI protocol signal lines.

10. The digital serial communication method of claim 6, comprising
    enabling the first selectable serial communication circuit and disabling the second selectable serial communication circuit upon the common bus interface receiving a signal having a first state, and
    disabling the first selectable serial communication circuit and enabling the second selectable serial communication circuit upon the common bus interface receiving the signal having a second state.

11. The digital serial communication method of claim 6, further comprising:

multiplexing signals from the first serial communication circuit to the register bank when the signal received by the common bus interface is in the first state; and multiplexing signals from the second serial communication circuit to the register bank when the signal received by the common bus interface is in the second state.

12. The digital serial communication method of claim 11, comprising coupling the data in the read only register to an electronic device.

\* \* \* \* \*